United States Patent
Reynolds, Jr. et al.

(10) Patent No.: US 7,686,350 B2
(45) Date of Patent: Mar. 30, 2010

(54) MISMATCHED FLANKS FOR A WEDGE THREAD

(75) Inventors: Harris A. Reynolds, Jr., Houston, TX (US); Robert S. Sivley, IV, Kingwood, TX (US)

(73) Assignee: Hydril LLC, Houston, TX (US)

( * ) Notice: Subject to any disclaimer, the term of this patent is extended or adjusted under 35 U.S.C. 154(b) by 305 days.

(21) Appl. No.: 11/393,452

(22) Filed: Mar. 30, 2006

(65) Prior Publication Data
US 2007/0236014 A1     Oct. 11, 2007

(51) Int. Cl.
F16L 25/00     (2006.01)
(52) U.S. Cl. ..................................... 285/334
(58) Field of Classification Search ................. 285/333, 285/334
See application file for complete search history.

(56) References Cited

U.S. PATENT DOCUMENTS

| | | | | |
|---|---|---|---|---|
| 597,000 | A * | 1/1898 | Higbee | 285/333 |
| 2,183,644 | A * | 12/1939 | Frame | 285/333 |
| 3,069,961 | A * | 12/1962 | Baubles | 285/334 |
| 3,989,284 | A * | 11/1976 | Blose | 285/334 |
| RE30,647 | E | 6/1981 | Blose | |
| 4,600,224 | A * | 7/1986 | Blose | 285/334 |
| 4,600,225 | A * | 7/1986 | Blose | 285/334 |
| 4,703,954 | A | 11/1987 | Ortloff | |
| 4,917,409 | A * | 4/1990 | Reeves | 285/334 |
| 4,928,999 | A | 5/1990 | Landriault et al. | |
| RE34,467 | E | 12/1993 | Reeves | |
| 5,360,239 | A | 11/1994 | Klementich | |
| 5,454,605 | A | 10/1995 | Mott | |
| 5,829,797 | A * | 11/1998 | Yamamoto et al. | 285/333 |
| 6,050,610 | A * | 4/2000 | Enderle et al. | 285/334 |
| 6,123,368 | A | 9/2000 | Enderle | |
| 6,206,436 | B1 | 3/2001 | Mallis | |
| 6,254,146 | B1 | 7/2001 | Church | |
| 6,454,315 | B1 * | 9/2002 | Yamaguchi | 285/334 |
| 6,481,760 | B1 * | 11/2002 | Noel et al. | 285/334 |
| 6,578,880 | B2 | 6/2003 | Watts | |
| 6,722,706 | B2 | 4/2004 | Church | |
| 6,767,035 | B2 | 7/2004 | Hashem | |
| 6,832,789 | B2 * | 12/2004 | Church | 285/333 |
| 6,976,711 | B2 * | 12/2005 | Sivley, IV | 285/333 |
| 7,331,614 | B2 * | 2/2008 | Noel et al. | 285/334 |
| 7,350,830 | B1 * | 4/2008 | DeLange et al. | 285/334 |

OTHER PUBLICATIONS

International Search Report dated Aug. 20, 2007, 3 pages.

* cited by examiner

*Primary Examiner*—David E Bochna
(74) *Attorney, Agent, or Firm*—Osha • Liang LLP

(57) ABSTRACT

Threaded connections including a pin member and a box member and are mismatched. The pin member and the box member have wedge threads formed thereon with a gap formed between pin and box load flanks and/or pin and box stab flanks of the threaded connection. The mismatch may comprise different flank angles and/or different flank profiles between corresponding flanks.

11 Claims, 5 Drawing Sheets

MISMATCHED FLANKS FOR A WEDGE THREAD

CROSS-REFERENCE TO RELATED APPLICATIONS

The present application is related to co-pending United States patent application filed concurrently herewith titled "Threaded Connection with Variable Flank Angles" having U.S. patent application Ser. No. 11/393300, assigned to the assignee of the present application and incorporated herein by reference in its entirety.

BACKGROUND OF INVENTION

Casing joints, liners, and other oilfield tubulars are often used in drilling, completing, and producing a well. Casing joints, for example, may be placed in a wellbore to stabilize a formation and protect a formation against high wellbore pressures (e.g., wellbore pressures that exceed a formation pressure) that could damage the formation. Casing joints are sections of steel pipe that may be coupled in an end-to-end manner by threaded connections, welded connections, and other connections known in the art. The connections are usually designed so that a seal is formed between an interior of the coupled casing joints and an annular space formed between exterior walls of the casing joints and walls of the wellbore. The seal may be, for example, an elastomer seal (e.g., an o-ring seal), a thread seal, a metal-to-metal seal formed proximate the connection, or similar seals known in the art.

One type of threaded connection commonly used to form a thread seal in oilfield tubulars is a wedge thread. In FIG. 1, a prior art connection 201 having a wedge thread is shown. "Wedge threads" are characterized by threads, regardless of a particular thread form, that increase in width (i.e., axial distance between load flanks 211 and 212 and stab flanks 213 and 214) in opposite directions on a pin member 203 and a box member 205. The rate at which the threads change in width along the connection is defined by a variable commonly known as a "wedge ratio." As used herein, "wedge ratio," although technically not a ratio, refers to the difference between the stab flank lead and the load flank lead, which causes the threads to vary in width along the connection. A detailed discussion of wedge ratios is provided in U.S. Pat. No. 6,206,436 issued to Mallis, and assigned to the assignee of the present invention. That patent is incorporated herein by reference in its entirety.

Wedge threads are extensively disclosed in U.S. Pat. No. RE 30,647 issued to Blose, U.S. Pat. No. RE 34,467 issued to Reeves, U.S. Pat. No. 4,703,954 issued to Ortloff, and U.S. Pat. No. 5,454,605 issued to Mott, all assigned to the assignee of the present invention and incorporated herein by reference. Continuing with FIG. 1, on the pin member 201, a pin thread crest 239 is narrow towards the distal end of the pin member 201 while a box thread crest 243 is wide. Moving along an axis 200 (from right to left), the pin thread crest 239 widens while the box thread crest 243 narrows. In FIG. 1, the threads are tapered, meaning that a pin thread 207 increases in diameter from beginning to end while a box thread 209 decreases in diameter in a complimentary manner. Having a thread taper may improve the ability to stab the pin member 203 into the box member 205 and distributes stress in the connection.

Generally, thread seals are difficult to achieve with non-wedge threads having broad crests and roots, however, the same thread forms may have thread seals when used for wedge threads. Wedge threads do not have any particular thread form. One example of a suitable thread form is a semi-dovetailed thread form disclosed in U.S. Pat. No. 5,360,239 issued to Klementich, and incorporated herein by reference. Another thread form includes a multi-faceted load flank or stab flank that mirror each other, as disclosed in U.S. Pat. No. 6,722,706 issued to Church, and incorporated herein by reference. Each of the above thread forms is considered to be a "trapped" thread form, meaning that at least a portion of the corresponding load flanks and/or corresponding stab flanks axially overlap. An open (i.e. not trapped) thread form with a generally rectangular shape is disclosed in U.S. Pat. No. 6,578,880 issued to Watts. Further, as disclosed in U.S. Pat. No. 6,767,035 issued to Hashem and incorporated by reference in its entirety, a two-start threaded connection uses a combination of open and trapped thread forms in a hybrid thread form. The above thread forms are examples of thread forms that may be used for embodiments of the invention. Generally, open thread forms such as buttress or stub are not suitable for wedge threads because they would impart a large radial force on the box member. A generally square thread form, such as that disclosed by Watts, or a trapped thread form does not impart an outward radial force on the box member. Those having ordinary skill in the art will appreciate that the teachings contained herein are not limited to particular thread forms.

For wedge threads, a thread seal may be accomplished as a result of the contact pressure and stress caused by interference over at least a portion of the connection between the pin load flank 211 and the box load flank 212 and between the pin stab flank 213 and the box stab flank 214, which occurs when the connection 201 is made-up. Close proximity or interference between the roots 241 and 245 and crests 239 and 243 completes the thread seal when it occurs over at least a portion of where the flank interference occurs. Generally, higher pressure may be contained with increased interference between the roots and crests ("root/crest interference") on the pin member 203 and the box member 205 and by increasing flank interference. The particular connection shown in FIG. 1 also includes a metal-to-metal seal that is accomplished by contact pressure between corresponding seal surfaces 204 and 206, respectively located on the pin member 203 and box member 205.

Wedge threads typically do not have a positive stop torque shoulder on the connection. For wedge threads that do not have a positive stop torque shoulder, the make-up is "indeterminate," and, as a result, the relative position of the pin member and box member varies more during make-up for a given torque range to be applied than for connections having a positive stop torque shoulder. As used herein, "make-up" refers to threading a pin member and a box member together. "Selected make-up" refers to threading the pin member and the box member together with a desired amount of torque, or based on a relative position (axial or circumferential) of the pin member with the box member. For wedge threads that are designed to have both flank interference and root/crest interference at a selected make-up, both the flank interference and root/crest interference increase as the connection is made-up (i.e. increase in torque increases flank interference and root/crest interference). For tapered wedge threads that are designed to have root/crest clearance, the clearance decreases as the connection is made-up. Regardless of the design of the wedge thread, corresponding flanks come closer to each other (i.e. clearance decreases or interference increases) during make-up. Indeterminate make-up allows for the flank interference and root/crest interference to be increased by increasing the make-up torque on the connection. Thus, a wedge thread may be able to thread-seal higher pressures of gas and/or liquid by designing the connection to have more flank interference and/or root/crest interference by increasing the make-up torque on the connection. However, this also increases stress on the connection during make-up, which could lead to failure during use.

Before make-up of a shouldered threaded connection, pipe dope is typically applied to both the pin member and the box member. Pipe dope provides lubrication to aid the make-up of the connection and helps prevent galling to allow for the connection to be broken-out at a later time. However, because of the close-fitting manner in which wedge threads make-up, as compared to a shouldered non-wedge thread connection, less pipe dope is required. Typically then, in a wedge thread connection, the pipe dope is only applied to the pin thread of the connection. The application of the pipe dope is also typically achieved with a brush, instead of a large swab (as is typical of other non-wedge thread connections). When a wedge thread connection is made-up, excess pipe dope may become trapped between the pin thread and the box thread, which may cause false torque readings (leading to improper make-up) or potentially damage the connection by expanding the box member. Accordingly, it would be desirable for a threaded connection to be able to control the high pressure build-up of pipe dope to avoid damage from trapped pipe dope.

SUMMARY OF INVENTION

In one aspect, the present invention relates to a threaded connection. The threaded connection includes a pin member having a pin thread and a box member having a box thread. The pin thread includes a pin crest, a pin root, a pin load flank having a pin load flank profile and oriented at a pin load flank angle, and a pin stab flank having a pin stab flank profile and oriented at a pin stab flank angle. The box thread includes a box crest, a box root, a box load flank having a box load flank profile and oriented at a box load flank angle, and a box stab flank having a box stab flank profile and oriented at a box stab flank angle. The pin thread and the box thread are wedge threads, and at least one of the pin and box load flanks and the pin and box stab flanks are mismatched.

In another aspect, the present invention relates to a threaded connection. The threaded connection includes a pin member having a pin thread and a box member having a box thread. The pin thread includes a pin crest, a pin root, a pin load flank having a pin load flank profile and oriented at a pin load flank angle, and a pin stab flank having a pin stab flank profile and oriented at a pin stab flank angle. The box thread includes a box crest, a box root, a box load flank having a box load flank profile and oriented at a box load flank angle, and a box stab flank having a box stab flank profile and oriented at a box stab flank angle. The pin thread and the box thread are wedge threads, and at least one gap is formed between at least one of the pin and box load flanks and the pin and box stab flanks.

Other aspects and advantages of the invention will be apparent from the following description and the appended claims.

DETAILED DESCRIPTION

The present invention relates to threaded connections with wedge threads. Specifically, the present invention relates to wedge thread connections in which at least one flank is mismatched with its corresponding flank. As used herein, "mismatched" flanks are corresponding flanks having different flank angles and/or different flank profiles. Embodiments of the present invention with different flank profiles are threaded connections with a flank profile on one flank and a different, non-complementing flank profile on a corresponding flank. Further, embodiments of the present invention may be desirable for use with a sealing material, such as pipe dope.

Figure 1:
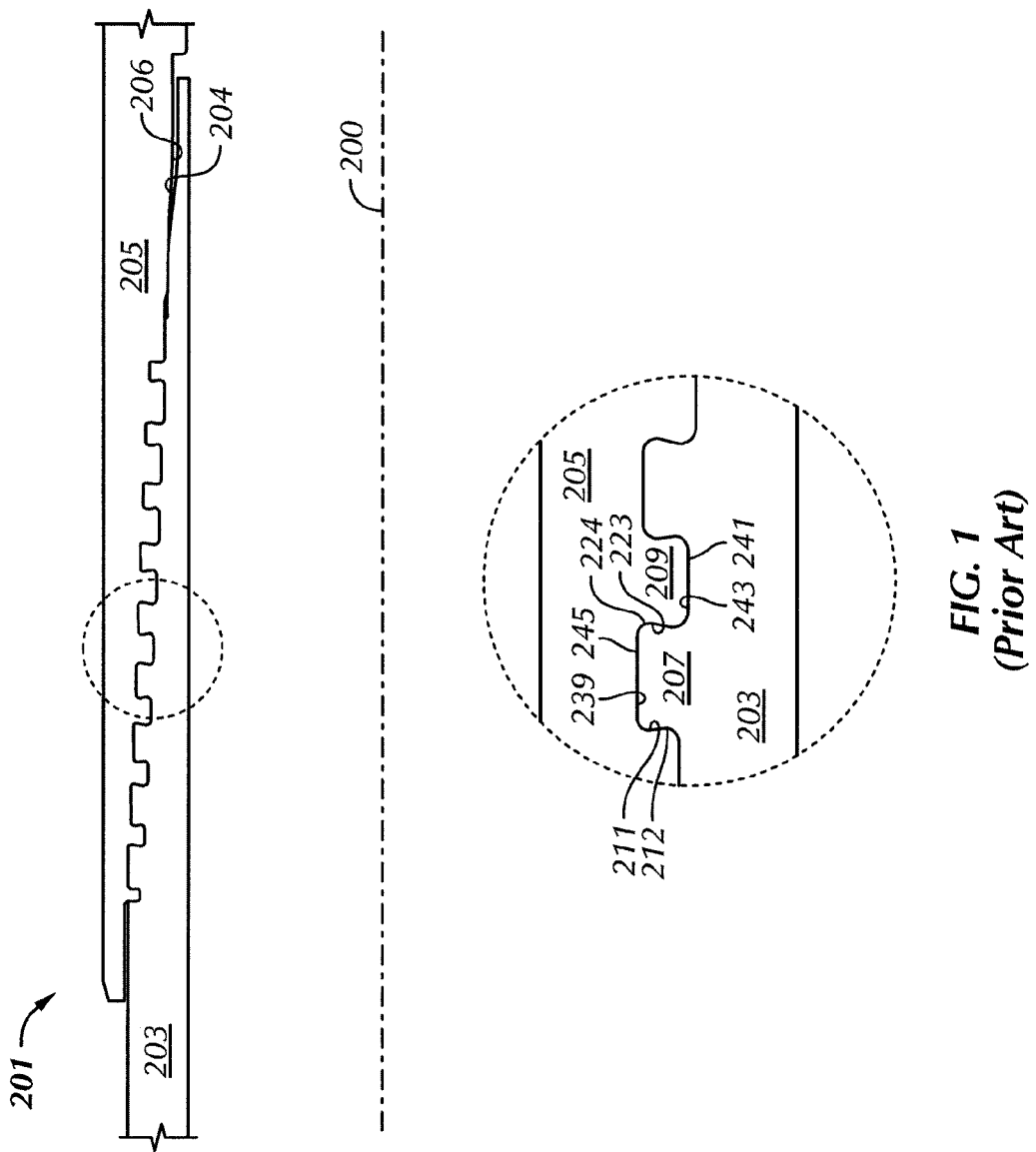
FIG. 1 shows a prior art wedge thread connection.
Figure 2:
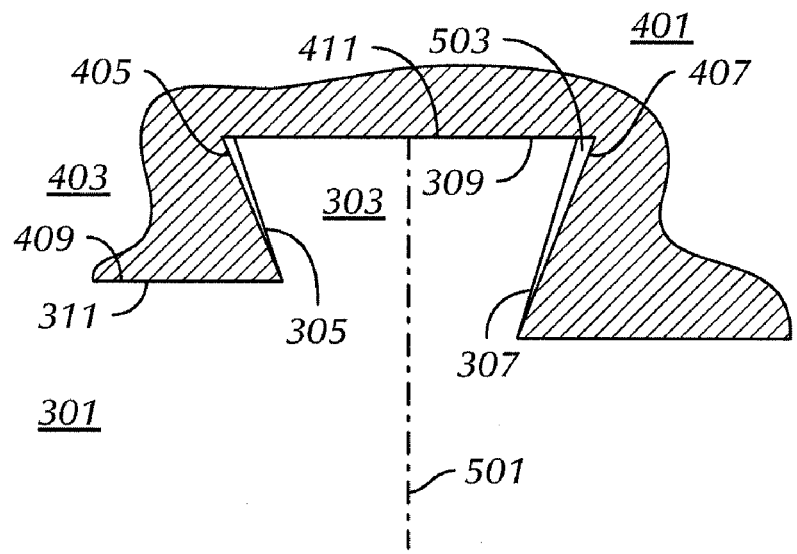
FIG. 2 shows a portion of a threaded connection in accordance with an embodiment of the present invention.

Referring to FIG. 2, a portion of a wedge thread connection in accordance with an embodiment of the present invention is shown. The threaded connection includes a pin member 301 and a box member 401. The pin member 301 has a wedge thread 303 which makes up to wedge thread 403 on the box member 401. The wedge thread 303 of the pin member 301 includes a pin load flank 305 and a pin stab flank 307, which correspond with a box load flank 405 and a box stab flank 407 of the wedge thread 403 of the box member 401, respectively. The thread 303 on the pin member 301 also has a pin crest 309 and a pin root 311 and the thread 403 on the box member 401 has a box crest 409 and a box root 411. The pin crest 309 corresponds with the box root 411, and the pin root 311 corresponds with the box crest 409.

Referring still to FIG. 2, the pin load flank 305 is oriented at a pin load flank angle and the pin stab flank 307 is oriented at a pin stab flank angle. Similarly, the box load flank 405 is oriented at a box load flank angle and the box stab flank 407 is oriented at a box stab flank angle. In this embodiment, the pin load flank 305 and the box load flank 405, flanks which correspond with each other, are mismatched with different flank angles. Further, the pin stab flank 307 and the box stab flank 407, also flanks which correspond with each other, also are mismatched with different flank angles. Specifically, the flanks 305, 307, 405, and 407 are mismatched because the box load flank angle is larger than the pin load flank angle and the box stab flank angle is larger than the pin stab flank angle with respect to a line 501 perpendicular with a central axis of the threaded connection. The mismatch of flank angles is exaggerated in FIG. 2 for purposes of illustration, though the shown embodiment is still within the scope of the present invention. The mismatch of flank angles forms a gap 503 between each of the flanks 305, 307, 405, and 407 of the threaded connection. Because the box flanks 405 and 407 have a larger flank angle than the pin flanks 305 and 307, the gap 503 is thin at the bottom of the pin flanks 305 and 307 and proceeds to widen moving towards the top of the pin flanks 305 and 307. Those having ordinary skill in the art will appreciate that the present invention is not limited to certain flanks of the threaded connection having more angle relative to one another. For example, in another embodiment, the pin flanks may have a larger flank angle than the box flanks instead. This embodiment would form a gap between the flanks that is wide at the bottom of the pin flanks and proceeds to narrow towards the top of the pin flanks. Further, those having ordinary skill in the art will appreciate that the present invention is not limited to having mismatched flanks across the entire threaded connection. In one embodiment, only a selected portion of the threaded connection may have mismatched flanks. For example, the threaded connection may have mismatched flanks at the ends of the connection and the mismatch fades away as moving towards the middle of the threaded connection.

When a threaded connection is made-up using pipe dope, the pipe dope may become trapped between the pin thread and the box thread. The gaps formed in embodiments of the present invention may be used as regions of relief for trapped pipe dope. The trapped pipe dope, which is under high pressure, may run into and fill the gaps between the flanks of the pin and box member during make-up for pressure relief. When the gaps become filled with excess pipe dope, the gaps may then allow pipe dope to flow through the threaded connection to be "squeezed" out. The excess pipe dope may be squeezed out at the ends of the connection.

Figure 3:
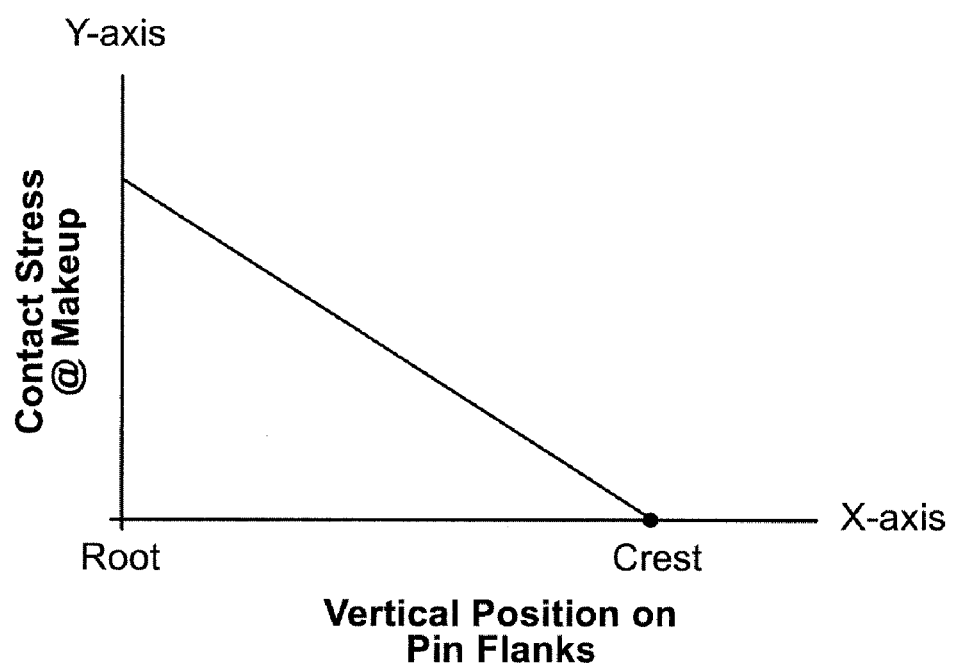
FIG. 3 shows a graph illustrating contact stress at make-up versus vertical position on a pin flank of the connection shown in FIG. 2 in accordance with an embodiment of the present invention.

Referring now to FIG. 3, a graph illustrating contact stress at make-up of the pin flanks 305 and 307 of the pin member 301 of the wedge thread connection shown in FIG. 2 versus vertical position on the mismatched pin flanks 305 and 307 in accordance with an embodiment of the present invention is shown. In the graph, the x-axis represents the vertical position on the pin flanks 305 and 307, in which the x-axis begins at the intersection of the pin root 311 and the pin flanks 305 and 307 and increases as moving vertically along the pin flanks 305 and 307 towards the intersection of the pin crest 309 and the pin flanks 305 and 307. The y-axis of the graph represents the stress in the wedge thread connection on the pin flanks 305 and 307 after the connection has been made-up with the box member 401 shown in FIG. 2. As is shown in the graph in FIG. 3, maximum contact stress occurs at the lowest point on the pin flanks 305 and 307 (the intersection of the pin flanks 305 and 307 with the pin roots 311), and decreases as moving towards the highest point on the pin flanks 305 and 307 (the intersection of the pin flanks 305 and 307 with the pin crests 309). This indicates that the gap 305 in the connection shown in FIG. 2 allows maximum contact stress at the thin portion of the gap 305 and minimum contact stress at the widest portion of the gap 305.

Figure 4:
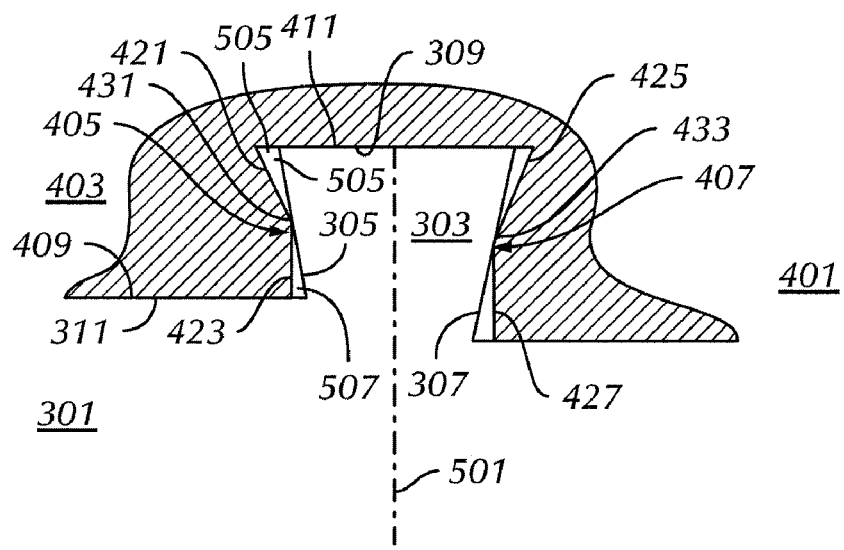
FIG. 4 shows a portion of a threaded connection in accordance with an embodiment of the present invention.

Referring now to FIG. 4, another portion of a wedge thread connection having mismatched flanks in accordance with an embodiment of the present invention is shown. In this embodiment, the pin load flank 305 is still oriented at the pin load flank angle and the pin stab flank 307 is still oriented at the pin stab flank angle. However, the box load flank 405 and the box stab flank 407 now have two different portions. The box load flank 405 has an upper portion 421 and a lower portion 423, in which the box load flank portions 421 and 423 are oriented at different flank angles with respect to one another, and the box stab flank 407 similarly has an upper portion 425 and a lower portion 427, in which the box stab flank portions 425 and 427 are also oriented at different flank angles with respect to one another. The upper portion 421 and the lower portion 423 of the box load flank 405 intersect at a junction point 431, which in this embodiment is about the mid-point of the box load flank 405. Similarly, the upper portion 425 and the lower portion 427 of the box stab flank 407 intersect at a junction point 433, which in this embodiment is about the mid-point of the box stab flank 407.

Further, still referring to FIG. 4, the upper portions 421 and 425 of the box flanks 405 and 407 have a larger angle than the pin flanks 305 and 307 with respect to the line 501 perpendicular with a central axis of the threaded connection, and the lower portions 423 and 427 of the box flanks 405 and 407 have a smaller angle than the pin flanks 305 and 307 with respect to the line 501 perpendicular with a central axis of the threaded connection. This mismatch of flank angles forms an upper gap 505 and a lower gap 507 between the pin flanks 305 and 307 and the box flanks 405 and 407 of the wedge thread connection. Those having ordinary skill in the art will appreciate that the present invention is not limited to only two flank angles for one flank. For example, in another embodiment, a flank of the pin member or box member may have three different portions which may have three different flank angles.

Figure 5:
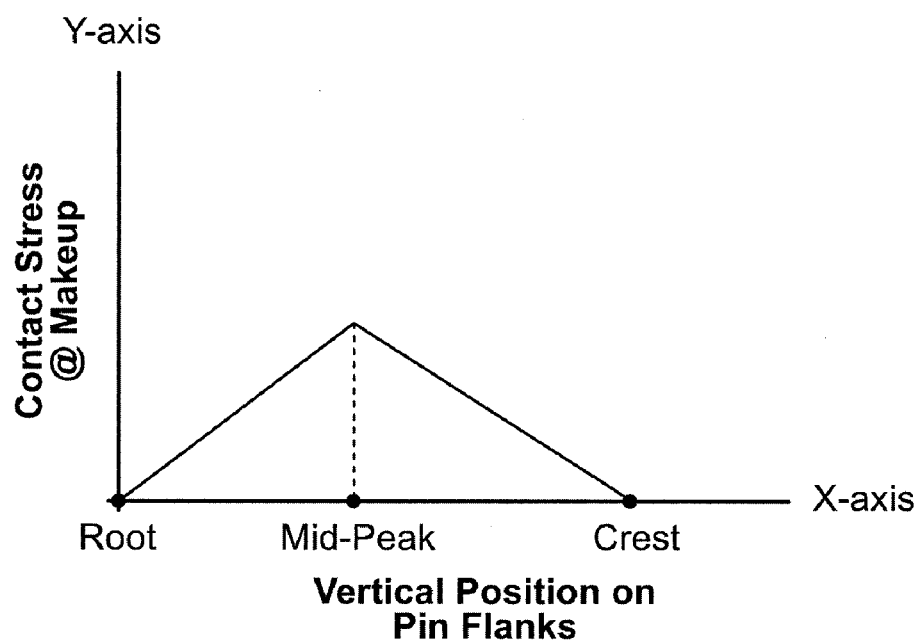
FIG. 5 shows a graph illustrating contact stress at make-up versus vertical position on a pin flank of the connection shown in FIG. 4 in accordance with an embodiment of the present invention.

Referring now to FIG. 5, a graph illustrating contact stress at make-up of the pin flanks 305 and 307 of the pin member 301 of the wedge thread connection shown in FIG. 4 versus vertical position on the mismatched pin flanks 305 and 307 in accordance with an embodiment of the present invention is shown. Similar to FIG. 3, the x-axis represents the vertical position on the pin flanks 305 and 307, and the y-axis represents the stress on the pin flanks 305 and 307 after the connection has been made-up with the box member 401. As shown in the graph in FIG. 5, minimum contact stress occurs at the lowest and highest vertical positions on the pin flanks 305 and 307 (the intersection of the pin flanks 305 and 307 with the pin roots 311 and the intersection of the pin flanks 305 and 307 with the pin crests 309, respectively). Maximum contact stress occurs at the junction points 431 and 433 on the pin flanks 305 and 307. However, to reduce the maximum amount of contact stress in the connection in FIG. 4, the junction points 431 and 433 may be formed with a radius. Depending on the size of the radius, this may reduce the amount of the maximum contact stress and distribute the contact stress along the pin flanks.

Figure 6:
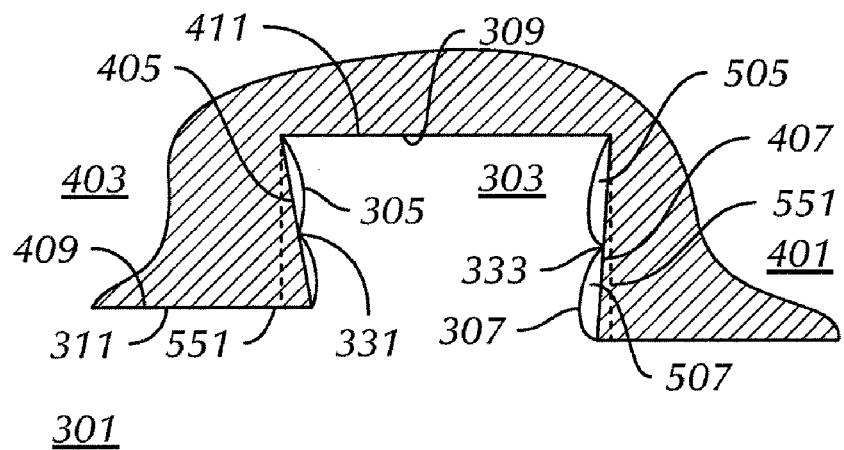
FIG. 6 shows a portion of a threaded connection in accordance with an embodiment of the present invention.

Referring now to FIG. 6, another portion of a wedge thread connection having mismatched flanks in accordance with an embodiment of the present invention is shown. The pin load flank 305 has a pin load flank profile and the corresponding box load flank 405 has a box load flank profile. Also, the pin stab flank 307 has a pin stab flank profile and the corresponding box stab flank 407 has a box stab flank profile. The "flank profile" refers to the shape or contour of the flank. In this embodiment, the flank profiles between corresponding flanks are mismatched. Specifically, the pin load flank 305 has a ridge 331 and the pin stab flank 307 has a ridge 333, making the pin load flank profile mismatch with the corresponding box load flank profile and the pin stab flank profile mismatch with the corresponding box stab flank profile. When the wedge thread connection is made-up, the ridges 331 and 333 on the pin flanks 305 and 307 contact the box flanks 405 and 407. This mismatch forms the upper gap 505 and the lower gap 507 between the pin flanks 305 and 307 and the box flanks 405 and 407 of the wedge thread connection, similar to the embodiment shown in FIG. 4. If the flank profiles were not mismatched, the flanks may still have ridges, but the corresponding flanks would complement the flanks with ridges to not have any gaps formed between the flanks when the connection is made-up. Those having ordinary skill in the art will appreciate that the present invention is not limited to certain flanks of the threads of the threaded connection having the ridges. For example, in another embodiment, the box flanks may have the ridges instead of the pin flanks. Further, those having ordinary skill in the art will appreciate that the present invention is not limited to only one ridge per flank. In another embodiment, the box stab flank may have at least two ridges, which then may form at least three gaps between the pin and box stab flanks.

Preferably, in one or more embodiments of the present invention, the mismatched flanks of the wedge thread connection are located inside a "crest profile." A crest profile is defined by a set of lines perpendicular with the central axis of the threaded connection which extend towards the central axis from the ends of the root of the pin member or box member. For example, the crest profile in FIG. 6 is defined by lines 551, in which the mismatched flanks 305 and 307 of the pin member 301 are inside the crest profile. Typically, for wedge thread connections to have a crest profile, the connections have a trapped wedge form. As discussed above, a trapped wedge form refers to at least a portion of corresponding flanks overlapping axially. Thus, preferred embodiments of the present invention may have, but are not limited to, a trapped wedge form.

Figure 7:
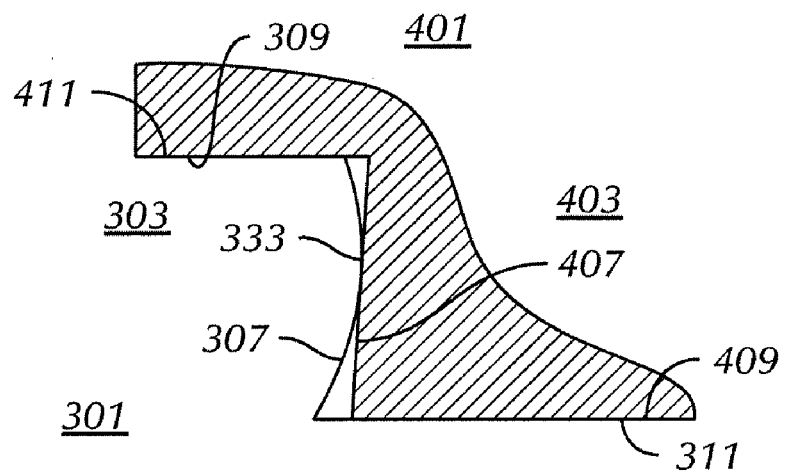
FIG. 7 shows a portion of a threaded connection in accordance with an embodiment of the present invention.
Figure 8:
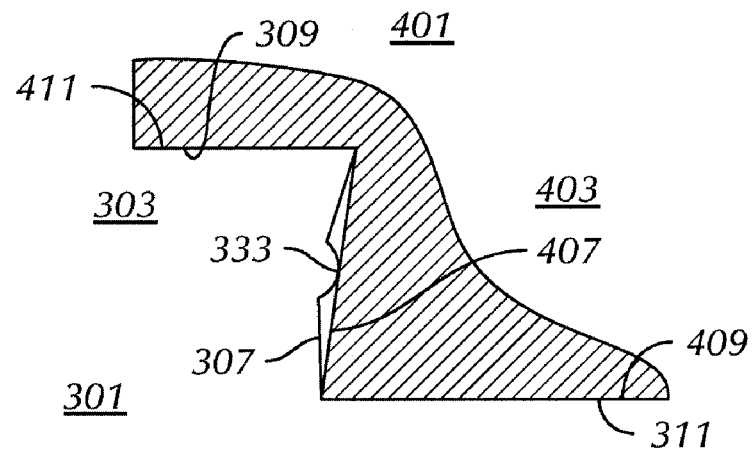
FIG. 8 shows a portion of a threaded connection in accordance with an embodiment of the present invention.
Figure 9:
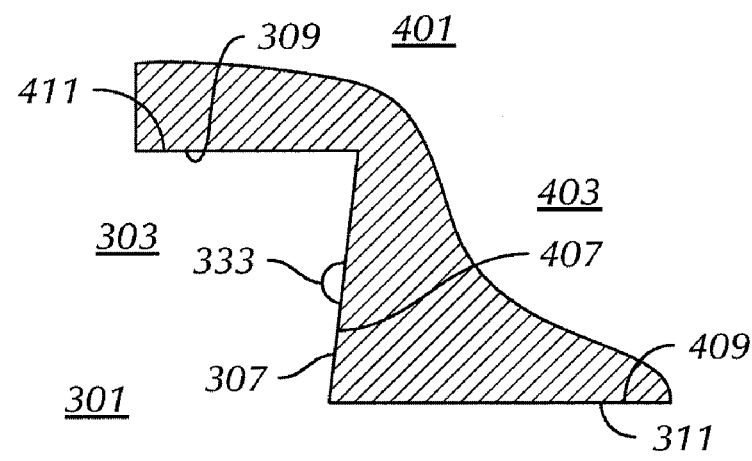
FIG. 9 shows a portion of a threaded connection in accordance with an embodiment of the present invention.

Referring now to FIGS. 7-9, other portions of wedge thread connections having mismatched flanks in accordance with one or more embodiments of the present invention are shown. Specifically, FIGS. 7-9 show examples of other mismatched flank profiles that the flanks of the threaded connections of the present invention may have. In FIG. 7, the pin stab flank 307 has a bulge 333. In FIG. 8, the pin stab flank 307 has a bump 333. In FIG. 9, the pin stab flank 307 has a groove 333. In the FIGS. 7-9 then, at least one gap is formed between the pin stab flank 307 and the box stab flank 407 of the wedge thread connections. Those having ordinary skill in the art will appreciate that other mismatched flank profiles may also be used without departing from the scope of the present invention.

Embodiments of the present invention may have one or more of the following advantages. As discussed above, when a threaded connection is made-up using pipe dope, the pipe dope may become trapped between the pin thread and the box thread. This may cause false torque readings or potentially damage the connection. Using embodiments of the present invention, the gaps between the mismatched flanks of the wedge thread connection may provide relief for the trapped pipe dope. The trapped pipe dope may run into and fill the gaps between the flanks of the pin and box member during make-up, rather than causing high pressure build up and failure of the connection. When the gaps become filled with pipe dope, the pipe dope may be able to flow within the gaps to allow excess pipe dope to be "squeezed" out. This excess pipe dope may then be squeezed out at the ends of the wedge thread connection.

Further, using embodiments of the present invention, make-up of threaded connections may be more indeterminate. As discussed above, the relative position of the pin member and the box member of a threaded connection may vary for a given applied torque range during make-up. Depending on the mismatch between corresponding flanks in the present invention, this given applied torque range may increase to make the threaded connection make-up more indeterminate.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A threaded connection comprising:
   a pin member comprising a pin thread having a pin crest, a pin root, a pin load flank having a pin load flank profile and oriented at a pin load flank angle, and a pin stab flank having a pin stab flank profile and oriented at a pin stab flank angle; and
   a box member comprising a box thread having a box crest, a box root, a box load flank having a box load flank profile and oriented at a box load flank angle, and a box stab flank having a box stab flank profile and oriented at a box stab flank angle;
   wherein the pin thread and the box thread are wedge threads;
   wherein the pin and box load flank profiles are mismatched and the pin and box stab flank profiles are mismatched; and
   wherein the pin crests and box roots are matched such that the pin crests and box roots are configured to form a substantially gapless engagement therebetween; and
   wherein the pin roots and box crests are matched such that the pin roots and box crests are configured to form a substantially gapless engagement therebetween.

2. The threaded connection of claim 1, wherein the mismatched profiles comprise different flank angles of at least one of the pin and box load flank angles and the pin and box stab flank angles.

3. The threaded connection of claim 1, wherein the mismatch is inside a crest profile of at least one of the pin thread crest and box thread crest.

4. The threaded connection of claim 1, wherein the mismatch forms at least one gap between at least one of the pin and box load flanks and the pin and box stab flanks.

5. The threaded connection of claim 1, wherein at least one of the pin load flank, the pin stab flank, the box load flank, and the box stab flank has an upper portion and a lower portion.

6. The threaded connection of claim 5, wherein the upper portion and the lower portion are oriented at different flank angles.

7. The threaded connection of claim 1, wherein at least a portion of the pin thread and the box thread has a trapped wedge form.

8. A threaded connection comprising:
   a pin member comprising a pin thread having a pin crest, a pin root, a pin load flank having a pin load flank profile and oriented at a pin load flank angle, and a pin stab flank having a pin stab flank profile and oriented at a pin stab flank angle; and
   a box member comprising a box thread having a box crest, a box root, a box load flank having a box load flank profile and oriented at a box load flank angle, and a box stab flank having a box stab flank profile and oriented at a box stab flank angle;
   wherein the pin thread and the box thread are wedge threads;
   wherein a first gap is formed between the pin and box load flanks and a second gap is formed between the pin and box stab flanks; and
   wherein the pin crests and box roots are matched such that the pin crests and box roots are configured to form a substantially gapless engagement therebetween; and
   wherein the pin roots and box crests are matched such that the pin roots and box crests are configured to form a substantially gapless engagement therebetween.

9. The threaded connection of claim 8, wherein the pin and box load flank profiles and the pin and box stab flanks both are mismatched with each other.

10. The threaded connection of claim 9, wherein the mismatch comprises different flank angles of at least one of the pin and box load flank angles and the pin and box stab flank profiles angles.

11. The threaded connection of claim 8, wherein at least a portion of the pin thread and the box thread has a trapped wedge form.

* * * * *